(12) United States Patent
Crespo et al.

(10) Patent No.: US 10,018,854 B2
(45) Date of Patent: Jul. 10, 2018

(54) CUSTOM OPHTHALMIC LENS DESIGN DERIVED FROM MULTIPLE DATA SOURCES

(71) Applicant: Indizen Optical Technologies of America, LLC, Torrance, CA (US)

(72) Inventors: Daniel Crespo, Rancho Palos Verdes, CA (US); José Alonso, Madrid (ES); Eduardo Pascual, Madrid (ES); Juan Antonio Quiroga, Madrid (ES)

(73) Assignee: Indizen Optical Technologies of America, LLC, Torrance, CA (US)

( * ) Notice: Subject to any disclaimer, the term of this patent is extended or adjusted under 35 U.S.C. 154(b) by 133 days.

(21) Appl. No.: 15/189,929

(22) Filed: Jun. 22, 2016

(65) Prior Publication Data

US 2017/0371178 A1 Dec. 28, 2017

(51) Int. Cl.
*G02C 7/02* (2006.01)
*G06N 99/00* (2010.01)
*G02C 7/06* (2006.01)

(52) U.S. Cl.
CPC ............ *G02C 7/027* (2013.01); *G02C 7/024* (2013.01); *G02C 7/061* (2013.01); *G06N 99/005* (2013.01)

(58) Field of Classification Search
CPC ........ G02C 7/027; G02C 7/024; G02C 7/028; G02C 7/06; G02C 7/061; G06N 99/005
USPC ........................................ 351/159.73–159.77
See application file for complete search history.

(56) References Cited

U.S. PATENT DOCUMENTS

| | | | |
|---|---|---|---|
| 6,199,983 B1 | 3/2001 | Kato et al. | |
| 7,980,692 B2 | 7/2011 | Fisher et al. | |
| 9,022,559 B2 | 5/2015 | Suzuki et al. | |
| 2003/0107707 A1 | 6/2003 | Fisher et al. | |
| 2005/0088616 A1* | 4/2005 | Nason | G02C 7/027 351/159.74 |
| 2005/0122472 A1* | 6/2005 | Fisher | G02C 7/02 351/159.06 |
| 2009/0066913 A1* | 3/2009 | Dai | A61B 3/0025 351/159.77 |
| 2009/0290125 A1 | 11/2009 | Vamas et al. | |

(Continued)

OTHER PUBLICATIONS

World Intellectual Property Organization, International Search Report and Written Opinion for international application No. PCT/US2017/036873, dated Aug. 16, 2017, 10 total pages.

*Primary Examiner* — Jordan Schwartz
(74) *Attorney, Agent, or Firm* — SoCal IP Law Group LLP; Mark Andrew Goldstein

(57) ABSTRACT

There is disclosed a method for recommending ophthalmic lens parameters. The method includes receiving user data from a plurality of lens wearers, receiving lens configuration information, and receiving satisfaction information for a plurality of lens wearers. The user data and satisfaction information are analyzed to identify and/or determine lens features based on correlations in the user data and the satisfaction information, including repeating the analyzing when additional user data and additional satisfaction information is received and/or on a regular basis. When new wearer information including a lens prescription for a new wearer and user data for the new wearer is received, lens parameters are produced for the new wearer including evaluating lens manufacturing characteristics based on the analyzing in correlation with the new wearer information.

9 Claims, 4 Drawing Sheets

(56) References Cited

U.S. PATENT DOCUMENTS

| | | |
|---|---|---|
| 2011/0222019 A1 | 9/2011 | Suzuki et al. |
| 2011/0270596 A1* | 11/2011 | Weeber .................... A61F 2/16 703/11 |
| 2012/0109595 A1 | 5/2012 | Legerton et al. |
| 2012/0229758 A1 | 9/2012 | Marin et al. |
| 2015/0124214 A1 | 5/2015 | Contet et al. |
| 2015/0309333 A1 | 10/2015 | Uchiyama et al. |
| 2016/0162965 A1 | 6/2016 | Lee et al. |
| 2016/0274383 A1* | 9/2016 | Petignaud .............. A61B 3/113 |
| 2017/0269385 A1* | 9/2017 | Fonte ................ G06Q 30/0621 |

* cited by examiner

CUSTOM OPHTHALMIC LENS DESIGN DERIVED FROM MULTIPLE DATA SOURCES

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to ophthalmic lenses and in particular to custom ophthalmic lenses based on multiple kinds of information from multiple sources including the lens wearer and other lens wearers.

Description of the Related Art

Progressive lenses have improved over the years. They were invented by 1900, but the manufacturing of these lenses was not practical until the beginning of the 1960s. The first lenses were rather crude, but they rapidly improved. Over a period of 20 years, the progressive surfaces of these lenses were optimized. However, a progressive surface and a progressive lens can be made an infinite number of different power distributions. So it is difficult to optimize a lens for a particular wearer. Each distribution may fit differently to each wearer. Some wearers require a longer distance from the far region to the near region of the lens; others require a shorter distance. Some wearers require a wider far region. Other wearers require a wider near region. Some wearers require a smooth transition from far to near, with minimum distortion, even if the resulting visual fields are reduced. Some wearers require the opposite: wider fields despite a greater (faster) transition of power in the lens. Even when a lens surface is perfectly optimized from a geometrical point of view from a geometrical point of view, improving one aspect of the lens will have a negative impact on other aspects.

All the factors used in describing and manufacturing a progressive lens combine in an extremely complex way to produce a resulting wearer's subjective perception of visual performance and comfort. Due to the large number of competing, complimentary and contradictory parameters affecting the performance of a lens, no accurate lens model exists.

Further, there are many factors or parameters defining the visual needs of a lens wearer. These include: tasks performed, the intensity and time devoted to each task; the need to perform tasks requiring competing properties of the lens (for example: both good far vision and good near vision); the position of wear; the biometric parameters of the wearer (pupillary distances, vertex distance, head position at far and near vision, etc.); and more.

Today, there are no models or clinical studies providing a clear relationship between lens properties—namely, the geometrical and optical properties defining a lens—and wearer characteristics—namely, the biometric parameters and the visual needs of the wearer. Moreover, there is no universal agreement about the importance of the myriad lens parameters and concomitantly no agreement about how to define or specify a wearer's visual needs (even though biometric parameters are easier to define and measure.) Scientific work in this field is scarce, and the available studies only measure or relate single parameters. There is limited understanding about the interaction of the many parameters involved in describing and manufacturing a progressive lens.

DETAILED DESCRIPTION

A method for the design of ophthalmic customized lenses based on information obtained from multiple sources and incorporating a machine-learning model is described herein. The information from multiple sources includes feedback from lens wearers and data about the particular lens customer. The machine-learning model adaptively generates rules to correlate user data with lens parameters. To prepare a prescribed lens for a new wearer, a system applying the method uses the generated rules to configure a lens in an effort to maximize the wearer's satisfaction.

Description of Apparatus

The methods described herein are typically implemented as software on one or more computer servers maintained by a lens manufacturer. In addition, the methods may include the creation of instructions for computer controlled manufacturing techniques and robotics used in manufacturing or producing contact lenses. The software that implements the methods described herein is stored on a machine readable storage media in a storage device included with or otherwise coupled or attached to a computer server. That is, the software is stored in electronic, machine readable media. These storage media include, magnetic media such as hard disks, optical media such as compact disks (CD-ROM and CD-RW) and digital versatile disks (DVD and DVD±RW); and silicon media such as flash memory cards and silicon storage devices (SSDs). As used herein, a storage device is a device that allows for reading and/or writing to a storage medium. Storage devices include hard disk drives, DVD drives, flash memory devices, SSDs and other readers of the storage media described in this paragraph.

Figure 1:
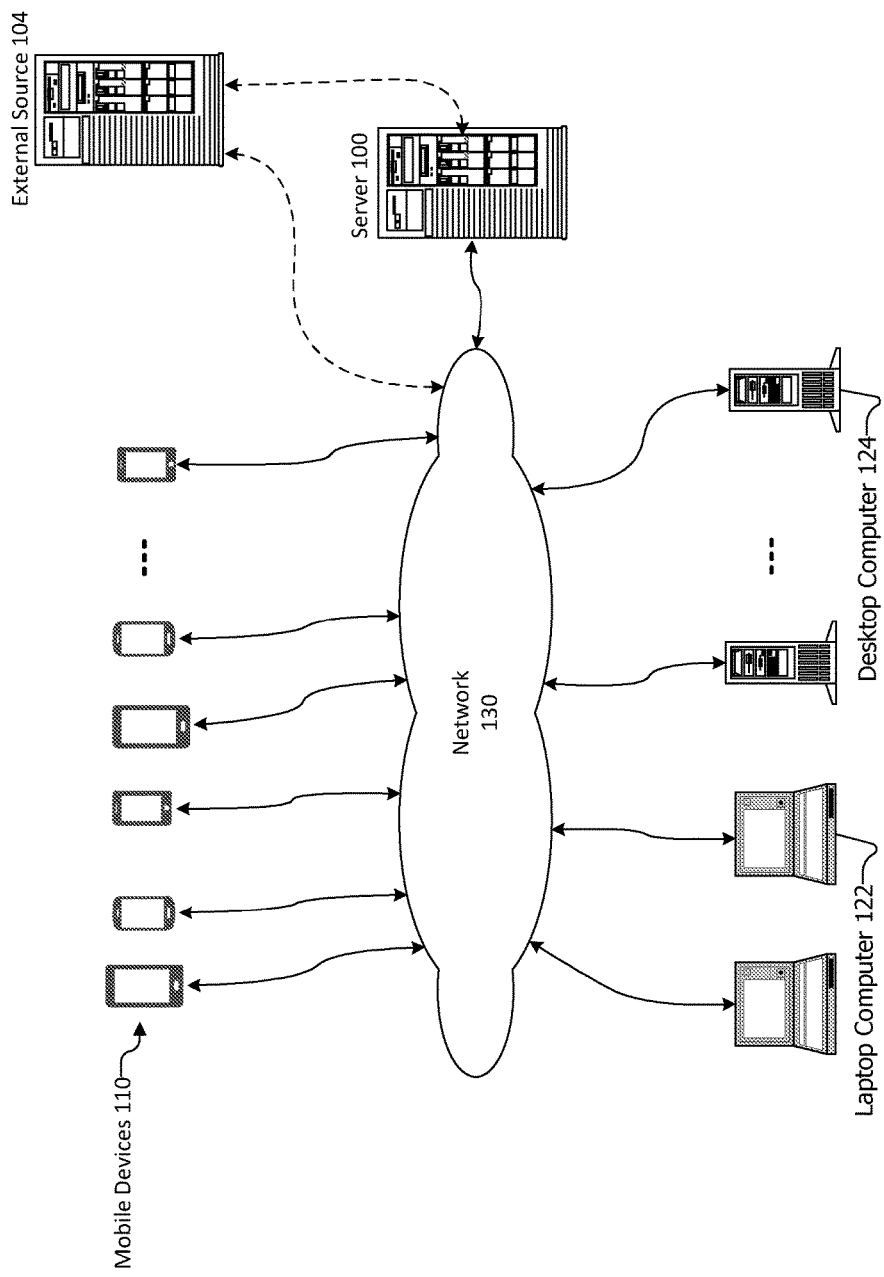
FIG. 1 is a block diagram of a system configuration for implementing the methods described herein.

Referring now to FIG. 1, there is shown a block diagram of a system configuration for implementing the methods described herein. The recommendation server 100 includes software that implements the methods described herein. The recommendation server 100 may be one or more servers each of which include a processor, memory, a communications interface (which may be one or more network interface cards (NICs) or devices) and storage devices such as hard disk drives (HDDs) and silicon storage devices (SSDs) as well as optical disk devices such as CDs and DVDs. The recommendation server 100 runs an operating system, such as, for example, a version of the Microsoft Windows operating system, Linux, Unix, and Apple MAC OS and may include or be augmented with virtual server software such as, for example, VMware. The lens recommendation server 100 includes a database a related software and/or is coupled to storage that serves as a database. The database included and/or coupled with the server may be, for example, a mongoDB, Cassandra, HBase, Structured Query Language (SQL), relational, Cloud Bigtable and/or other database, and the server 100 executes database supporting software such as, for example, database software provided by Oracle, SAP, Google, Microsoft and others.

The lens recommendation server 100 may access one or more external sources 104 which may be servers and/or databases maintained by ophthalmic researchers, other manufacturers, ophthalmic organizations and ophthalmic frame manufacturers and the like. The lens recommendation server 100 may access one or more one external sources 104 through a direct connection or through a network 130 such as the Internet through wired or wireless connections. Although only one lens recommendation server 100 and one external source 104 are shown, lens recommendation server 100 and the external source 104 represent and may be multiple servers and may each be a group of servers.

The software that implements the methods described herein runs on lens recommendation server 100 and communicates over network 130 with lens wearer CCDs and eye care provider (ECP) client computing devices (CCDs, described below) shown as, for example, mobile devices 110 (typically mobile phones and computing tablets), laptop computers 122 and desktop computers 124. Both lens wearers and ECPs may communicate with, provide information to and receive information from the lens manufacturer server 100 on mobile and stationary or connected CCDs. The lens wearer and EVP CCDs may include an app or application used to interact with lens manufacturer server 100. In addition or alternatively, the consumers and ECPs may interact with the lens manufacturer server 100 via a web browser on the CCDs.

A client computing device (CCD) includes software and/or hardware for providing or contributing to the functionality and features described herein. A CCD includes one or more of: logic arrays, memories, analog circuits, digital circuits, software, firmware, and processors such as microprocessors, field programmable gate arrays (FPGAs), application specific integrated circuits (ASICs), programmable logic devices (PLDs) and programmable logic arrays (PLAs). Some of the processes, functionality and features of the methods described herein may be embodied in whole or in part in software which operates on a CCD and may be in the form of firmware, an application program (aka an app), an applet (e.g., a Java applet), a browser plug-in, a COM object, a dynamic linked library (DLL), a script, one or more subroutines, or an operating system component or service.

A CCD as used herein refers to any device with a processor, memory and a storage device that may execute instructions including, but not limited to, personal computers, server computers, computing tablets, set top boxes, video game systems, personal video recorders, telephones, cellular telephones, personal digital assistants (PDAs), portable computers, and laptop computers. CCDs run an operating system, including, for example, variations of the Android, Linux, Microsoft Windows, and Apple Mac operating systems and typically include an Internet Browser such as, for example, Google Chrome, Apple Safari, Mozilla Firefox and the like.

Description of Processes

Figure 2:
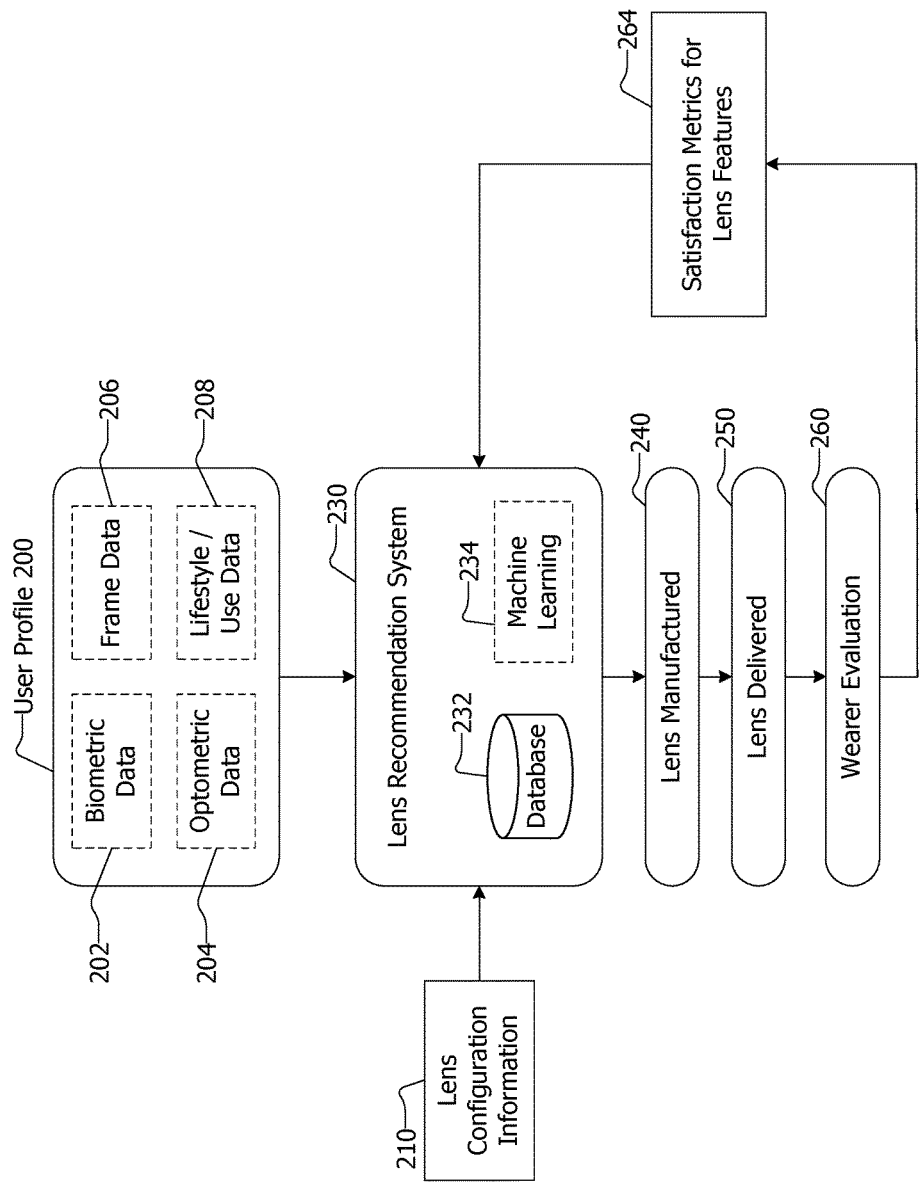
FIG. 2 is a virtual block diagram of components of a first version of a method described herein.

Referring now to FIG. 2 there is shown a virtual block diagram of components of a first version of a method described herein. At the center of the custom ophthalmic lens design system described herein is a lens recommendation system 230 that includes a database 232 and a machine learning component 234. At its most generalized level, the lens recommendation system 230 of the ophthalmic lens design system processes user profile information 200 and lens configuration information 210 to prepare recommended ophthalmic lens parameters for a customer or wearer which are used to manufacture a lens, as shown by lens manufactured 240 and lens delivered 250. In one embodiment, the lens manufacturer maintains the lens recommendation system (230) and manufactures the lens (240) which is delivered to a customer (250). In another embodiment, an independent entity maintains the lens recommendation system (230) and provides recommended lens parameters to manufactures who produce the lens (240) which is delivered to a customer (250).

Importantly, in the custom ophthalmic lens design system, wearer evaluation information 260 in the form of satisfaction metrics for lens features is obtained and received by the machine learning component 234 of the lens recommendation system 230. That is, the lens recommendation system 230 receives wearer evaluation information 260 regarding a particular lens in the form of satisfaction metrics for lens features 264 wearers from the lens wearer directly and/or through an ECP. In this way, when the lens recommendation system 230 makes configuration and manufacturing choices in the form of lens manufacturing parameters for a new lens for a new customer, lens recommendation system 230 takes into consideration multiple factors, including the satisfaction of other customers (lens wearers) who were provided and wore similar lenses for similar purposes as the current customer. Important to this processing is the machine learning component 234 of the lens recommendation system 230.

When receiving a user profile 200 from a new customer, the machine learning component (234) of the lens recommendation (230) compares and evaluates the current customer's user profile (200) in view of user profiles (200) of multiple earlier customers and their related satisfaction metrics for lens features (264). The machine learning component 234 creates and continuously adapts a metric for lens applicability based on the data stored in its database 232. An algorithm in the lens recommendation system 230 applies the applicability metric to known lens designs (210), data in the database (232) and the data in the new wearer's user profile (200) and provides recommended lens parameters for the new wearer's new lenses. The lens is then manufactured (240) and delivered (250) to the wearer. The wearer sends feedback in the form of a wearer evaluation (260) that includes satisfaction metrics for lens features (264) that is sent to the machine learning component (234) that will update and/or modify the applicability metric accordingly.

The user profile 200 may include biometric data 202, optometric data, frame data 206 and lifestyle/use data 208. The biometric data 202 may include, for example, some or all of pupillary distances, pupil heights, head position and tilt, Harmon distance, and others. The optometric data 204 may include, for example, some or all of current and past prescription(s), lens addition information, prism requirement information, binocular disorders, vision related health information, historical kind of lens used by the customer, and others. The frame data 206 may include, for example, pantoscopic and wrapping tilts, vertex distances, box size, distance between lenses, frame contour, and others. The lifestyle/use data may include, for example, some or all of customer age, gender, and geographic location (for example, zip code, city/state or town/province); activity/use preferences such as driving, reading, computer use, sporting use, and the like; and postural behavior.

The information included in the user data 200 may be designated by numbers or other codes such as alphabetical, numeric or alphanumeric, for example, and when numerical, various appropriate sized data may be used such as bits, 8 bit bytes, or 16, 24, 32 and 64, 128, 256 and larger bit words as appropriate for the particular kind of data. For example, the user data 200 may include encoded values for all the properties as numbers stored in a vector structure, $u=(u_1, u_2, \ldots, u_N)$, where the element $u_i$ is a real or integer number describing the i-th feature of the user U, where i is from 1 to N. In another example, a more general array structure may be used where $u=\{u_1, u_2, \ldots, u_N\}$, in which the element $u_i$ describes the i-th feature of the profile of user U, where i is from 1 to N. In various implementations, the component $u_i$ may be any type of data: a number, another vector, a text string, another data array, etc.

In one implementation, the user features are stored in a data structure u in which each field contains the relevant information for each feature, as a number, a vector, a general data array or even another substructure:

$$u.\text{prescription} = (S, C, \alpha),$$
$$u.\text{addition} = A,$$
$$\ldots$$
$$u.\text{tasks.driving} = (ImportanceFactor, PercentageTime),$$
$$\ldots$$

The advantage of these type of structures is that different type of information can be neatly organized, but because the information is not indexed, is not well suited for matrix analysis of the information. Processing algorithms included in the machine learning component 234 (described in more detail below) may include translators, transcribers, transcoders and the like for structured information to indexed information or feature vectors and vice versa.

The lens configuration information 210 includes information about the standard or typical characteristics and manufacturing characteristics of lenses. Similarly, for every lens manufactured according to the method, the prescription processing system stores detailed information about the lens. The lens configuration information as well as the stored information about lens's manufactured may include some or all of the following information: [a] lens material and geometry such as, for example, refractive index and abbe number of the lens material, base curve, edge and center thickness, thickness control by surface asphericity; [b] lens optical properties such as, for example, power and addition, prism; [c] lens optical performance such as, for example, surface asphericity to compensate for oblique aberrations; [d] progressive lens design features such as, for example, progression profile, corridor length, position of the start of the progression, position of the end of the progression, distribution of fields in the far and near regions, distribution of astigmatism in the astigmatic lobes, maximum value of unwanted astigmatism, distribution of inset; [e] lens coatings, such as for example, AR coatings, polarizing coatings, photochromic coatings, hard coatings, antifog, antidust, hydrophobic coatings; [f] additional lens data such as, for example, the lens manufacturing site (that is, the lens manufacturer), the lens dispensing site (that is, the optician or store the dispenses the lens), date and time of manufacturing, and others; and [g] other pertinent data.

In some implementations, the components in the lens data x are numbers. However, some lens data may contain more complex information that may be represented as strings of alphanumeric characters or structured data. Because of this, lens data x may be implemented as a type of data container which can store the necessary data. For example, all the lens properties may be encoded as numbers and stored in a vector structure, $x=(x_1, x_2, \ldots, x_M)$, where the element $x_i$ is a real or integer number describing the i-th feature of the lens L, where i is from 1 to M. In another implementation, a more general array structure may be used in which $x=\{x_1, x_2, \ldots, x_M\}$, where the element $x_i$ describes the i-th feature of the profile of the lens L, where i is from 1 to M. In various implementations, the component $x_i$ can be any type of data: a number, another vector, a text string, another data array, etc. In addition, the lens features may be stored in a data structure x in which each field contains the relevant information for each feature, as a number, a vector, a general data array or even another substructure:

$$x.Index = n,$$
$$x.BaseCurve = B,$$
$$\ldots$$
$$x.Profile.Length = CorridorLength$$
$$\ldots$$
$$x.Coatings.AR.Front = \text{``yes''}$$
$$\ldots$$

After a lens is dispensed to a customer, the lens recommendation system 230 obtains customer satisfaction metrics concerning lens features 264 from the customer. In one version of the method, the customer provides the customer satisfaction metrics 264 directly to the manufacturer using a manufacturer provided app or application or using a web page on a web browser on a mobile computing device or personal computer or other CCD that prompts the customer to provide a wearer evaluation 260. The customer may also provide customer satisfaction metrics 264 at a point of delivery such as an ECP or retailer using a computer terminal, mobile computing device or tablet running a manufacturer provided app or web page that prompts the customer to provide a wearer evaluation 260. In one version of the system, the ECP may interview a customer and report the customer satisfaction metrics 264 to the lens recommendation system 230. In this version of the method, the wearer evaluation 260 is administered by the ECP and pertinent information obtained from the customer curing the wearer evaluation is recorded by the ECP using a computer terminal, mobile computing device or tablet running a manufacturer provided app or web page that prompts the ECP to administer the wearer evaluation 260.

The customer satisfaction metrics 264 include some or all of the following: 1. Absolute level of satisfaction (a) to lens in general (quantitative or qualitative), (b) to performance of the lens for a specific viewing distance or range of viewing distances (quantitative or qualitative), (c) to performance of the lens for a specific task, (quantitative or qualitative); 2. Comparative level of satisfaction (a) to new lens compared with the previous lens (quantitative or qualitative), (b) to performance of the new lens for a specific viewing distance or range of viewing distances compared with the previous lens (quantitative or qualitative), (c) to performance of the new lens for a specific task compared to the previous lens (quantitative or qualitative); 3. Particular positive values of the lens; 4. Particular negative values of the lens; and others.

The machine learning component 234 of the prescription processing system determines the characteristics of lens L that should provide an increased or maximum expected satisfaction to a new user U. To make this evaluation, the machine learning component 234 may use a parametric hypothesis model $h_\theta(u,x)$ that is a function of the user's profile u and the lens' characteristics x and where $\theta$ is the set of parameters of the model (depending on the type of model used, $\theta$ can be a vector of values, a matrix or a series of vectors or matrices). The value of the hypothesis $$s = h_\theta(u,x)$$

represents the expected satisfaction s of user U when wearing the lens L, given the parameters $\theta$ of the model.

For example, one version of the method implements a linear model to evaluate expected satisfaction. In this version, the method translates the user data and lens data into vectors u and x with N and M components, respectively. The resulting $\theta$ is a vector with K components, where K=N+M. A concatenation vector with the same number of elements of $\theta$ that represents at the same time the user profile and the lens characteristics as $$y = (u,x) = (u_1, \ldots, u_N, x_1, \ldots x_M).$$

The linear satisfaction hypothesis is obtained by the scalar product of $\theta$ and x $$s = h_\theta(u,x) = \theta \cdot y.$$

This linear model is an example technique that could be used to compute the expected user satisfaction. Because of the different nature of the features of the lens and of the user's profile, some models used to evaluate expected satisfaction will be better (that is, more accurate) than others deriving from the features considered by the method. In another embodiment of the method, the satisfaction model is implemented as a logistic regression. In yet another embodiment, the satisfaction model is described by a neural network.

The lens recommendation system 230 evaluates the relevant features to be incorporated in and left out of a lens. The lens feature evaluation is difficult. The difficulty is caused by competing requirements and related constraints. That is, certain lens features correlate with and contradict consumer requirements. Further, lens features may be highly correlated with some lens requirements but uncorrelated with other lens features. In addition, same features may contain irrelevant information or may be redundant. Detecting relevant features and relevant combinations of lens features is an important function of the lens recommendation system 230.

In one version of the method, the lens recommendation system 230 uses the technique known as principal component analysis to find relevant correlations between complete sets of features, then evaluates the linear combinations of lens features that, given a set of customer features, determines the impact (whether it be large or small) on the anticipated satisfaction.

The machine learning component 234 of the lens recommendation uses one of the models and certain relevant features described above to adjust the parameters $\theta$ of the model. The adjustment is made by "learning" the best set of parameters from the available feedback that previous users (that is, lens wearers) have contributed to the database stored by the lens manufacturer.

When implemented using a linear hypothesis described above, when there are m available examples from users that have reported feedback about their lenses. Each example j is a point in a dataset containing the user and lens features and the reported satisfaction $\{y_j, s_j\}$. To train the linear hypothesis, a cost function like the following may be used:

$$J_\theta = \frac{1}{m} \sum_{j=1}^{m} (\theta \cdot y_j - s_j)^2.$$

The parameters $\theta$ of the satisfaction hypothesis are used to better predict the likelihood of satisfied customers/wearers by minimizing the cost function. That is, the parameters $\theta$ of the satisfaction hypothesis are selected to achieve a better average prediction for the set of available examples. This will be used to predict satisfaction for future users. The training can be periodical after accumulating a number of satisfaction metrics 264, may be performed at regular time intervals, or may be performed incrementally when a new satisfaction metric arrives from a customer.

The method recommends new lens parameters to a new user U based on analysis using a model described above to predict a user's likely satisfaction. For example, one among a group of available progressive lens designs is selected for which $h_\theta(u,x)$ is larger. Further, when a lens design has been selected, a material from a group of materials, a coating from the available coating options, and other lens features may be selected for those which $h_\theta(u,x)$ is larger. That is, prediction of the lens that better suits the user's profile can be separated into different selection process: one for selecting lens material, another one for selecting progressive design, etc. Each process may use its own set of lens and user features, and requires its own set of parameters $\theta$.

In another embodiment of the method, the optimization of user satisfaction encompasses all relevant parameters describing a whole lens, so that only one model $h_\theta(u,x)$ with a bigger set of parameters $\theta$ is used.

According to the lens recommendation system 230 and related methods described herein, the model that establishes the relationship between user and lens features and user satisfaction is continuously improving according to the machine learning 234. The vectors of parameters $\theta$ as determined by the last equation (in a linear model) or another equation, is updated each time the system receives the feedback in the form of customer satisfaction metrics for lens features 264 from the last user. In this way, the system evolves and becomes more intelligent over time as the user database grows. This allows the system to provide better suggestions for prescriptions over time.

The lens recommendation system 230 and the machine learning component 234 include "rules" that relate user features and lens features along with the growing database of satisfaction information and corresponding user profiles, as well as sets of models $h_\theta(u,x)$ used to estimate satisfaction that enable the machine-learning algorithms to compute a new set of parameters $\theta$ every time a user provides feedback to the system.

The lens recommendation system 230 can be used to guide the design of new lenses and improve lens satisfaction overall.

The lens recommendation system 230 may also provide analysis of those users who are less satisfied than others. Groups or clusters of users with low satisfaction may be automatically detected using clustering methods. For example, the clustering method may use a K-means algorithm to automatically find groups of users that have common characteristics. The algorithm is also used to detect distinctive sub-groups among those groups of users reporting low satisfaction. User profile information and/or lens features that are common or strongly correlated among the users of those groups are identified. This correlation information is used to evaluate if any given new user belongs to a group having potential low satisfaction based on user profile information and/or lens feature correlation. According to this, a new progressive lens design can be added to the system, or a new material and base curve selection, and upon having these new possibilities, a different recommendation model can be forged for the users belonging to any of those groups. Different designs or lens characteristics can be tested until that particular group goes up in satisfaction, while the recommendation rules for any users not falling under that group remain unchanged. In this way, the overall customer satisfaction can increase while ensuring that those groups with current high levels of satisfaction remain unaltered.

Figure 3:
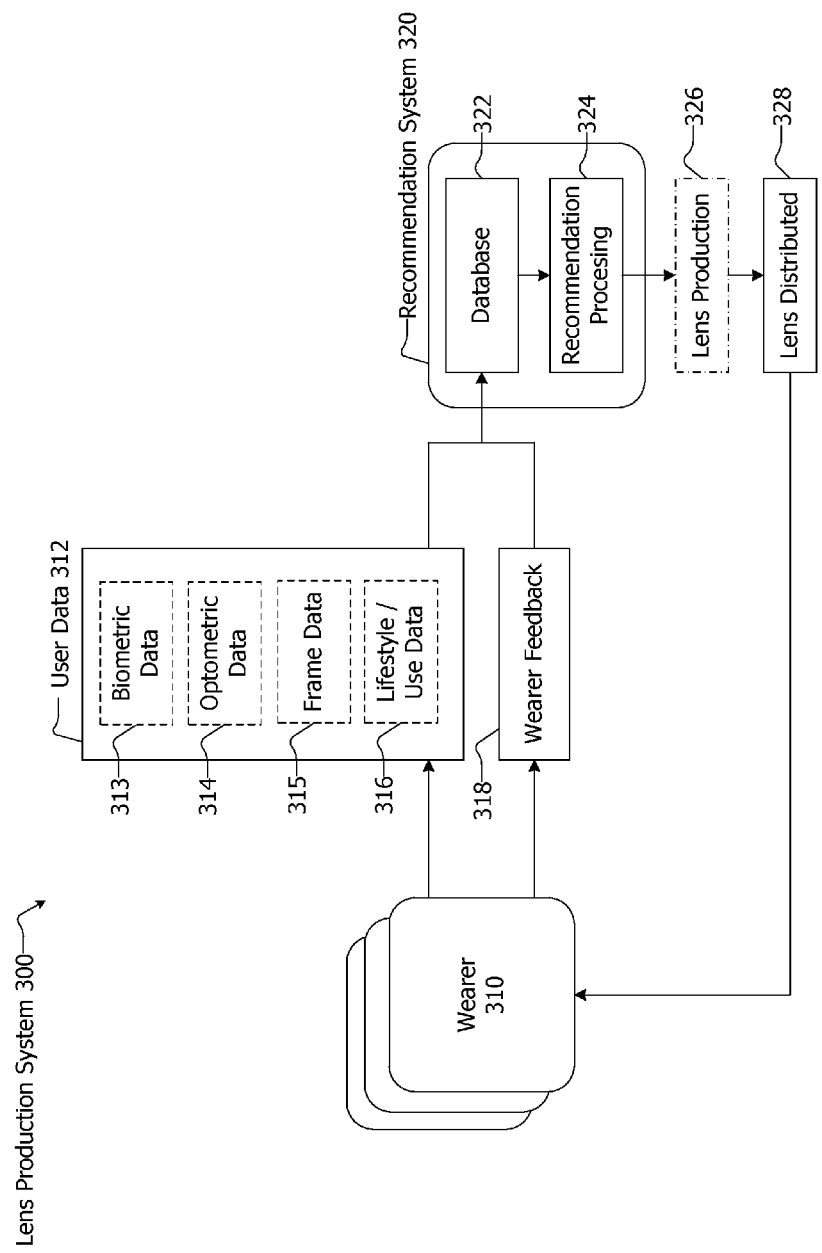
FIG. 3 is a virtual block diagram of components of a second version of a method described herein.

Referring now to FIG. 3, there is shown a virtual block diagram of components of a second version of a method described herein. A lens production system 300 includes a recommendation system 320 that receives user data 312 including optometric data 314, biometric data 313, frame data 315 and lifestyle/use data 316 from lens wearers 310 and also receives lens wearer feedback 318 (also known as customer satisfaction metrics 264) concerning the lens wearer's current and/or prior lenses from the lens wearers 310. The lens wearer feedback 318 may include or be the same information described above regarding the customer satisfaction metrics 264 shown in FIG. 2. The recommendation system 320 stores the user data 312 from multiple lens wearers in a database 322. The recommendation system 320 uses the information stored in the database 322 to perform recommendation processing 324 to produce recommended prescription lens features. The recommendation processing 324 includes machine learning and related processing described above regarding component 234 of FIG. 2. Based on the wearer feedback 318 and the user data 318 from multiple lens wearers, ongoing analysis and learning are performed by recommendation processing component 324. Based on the recommended prescription lens features provided by the recommendation processing component 324, a lens is produced as shown by lens production component 326, and then distributed to a lens wearer 310. The recommendation system 320, the lens production 325 and the lens distribution 328 may all be performed by the same entity; or the recommendation system 320 may be a separate entity form the lens producer performing the lens production 326. In practice, the lens producer may subscribe to, employ or hire the recommendation system provider to allow it to make better lenses than a competing lens producer.

Figure 4:
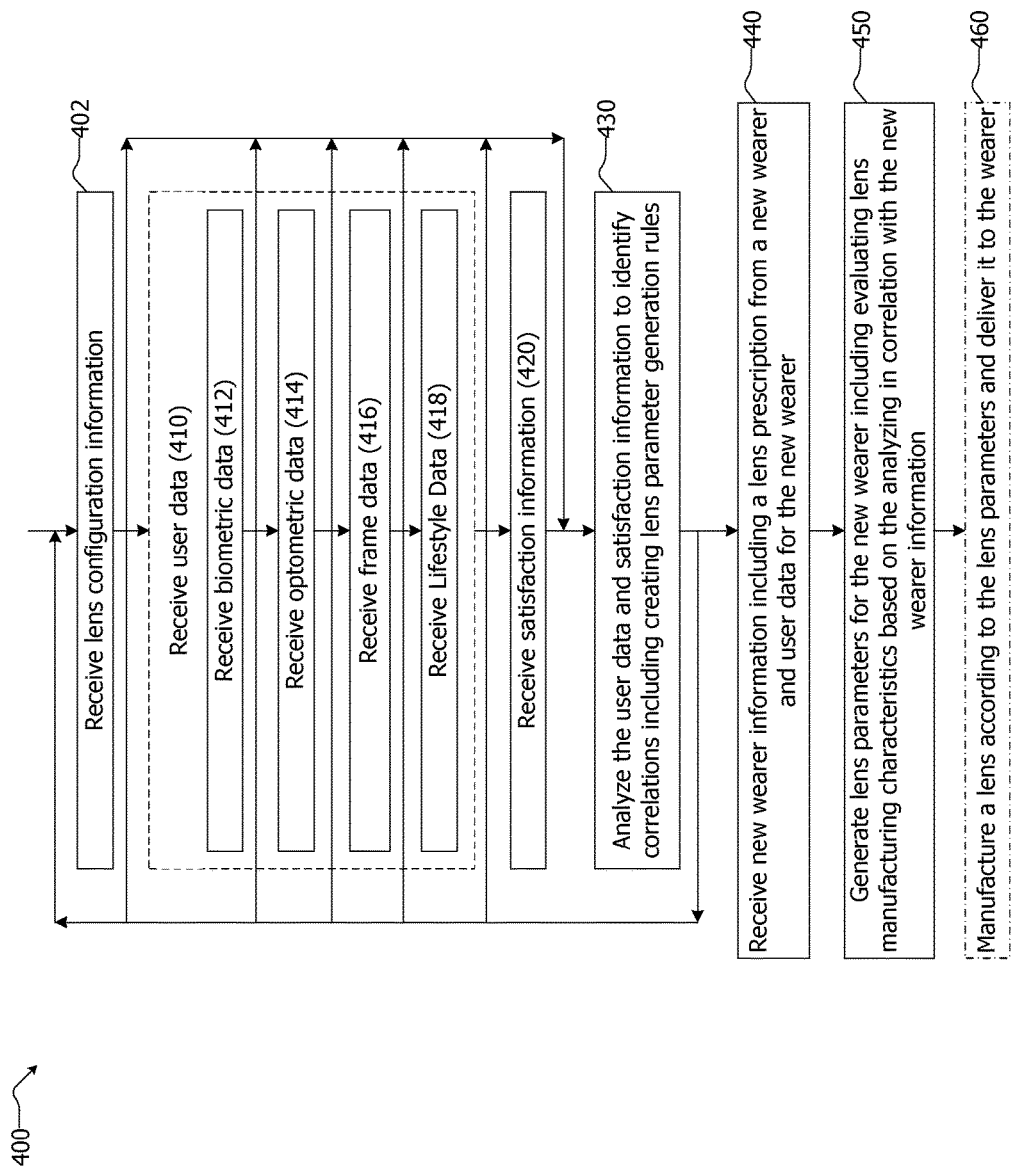
FIG. 4 is a flow chart of actions taken to generate lens parameters for a custom ophthalmic lens from multiple data sources.

Referring now to FIG. 4, a flow chart 400 of actions taken to generate lens parameters for a custom ophthalmic lens from multiple data sources is shown. When terminology regarding the method of FIG. 4 is used that is the same or similar to the terminology used regarding FIGS. 2 and 3, the terminology shall have the same meanings in all three drawings, systems and methods. In the flow chart 400, various information and data is received and then analyzed. The information received may be received in any order and is not limited to the order shown. Lens configuration information is received, as shown in block 402. User data is received, as shown in block 410. The user data may include one and typically more of biometric data (412), optometric data (414), frame data (416), and lifestyle data (418). The user data 410 and its constituent component data may be received together or separately from one another. Wearer satisfaction information is received, as shown in block 410. The satisfaction information may be or include the customer satisfaction metrics 264 and/or the wearer feedback 318. The receiving of configuration information 402, user data 410 and satisfaction information 420 may occur in any order and is not restricted to the order shown or described. The receiving of configuration information 402, user data 410 and satisfaction information 420 may occur periodically after a certain amount or number of data is available, may be performed at regular time intervals, or may be performed when new data is available.

Upon receipt of the configuration information 402, user data 410 and satisfaction information 420, each of the various kinds of data may be stored in a database. The storing may include transcribing, converting, and normalizing as may be appropriate for or applicable to the kind of data received or the format in which the data was received or the scale or other metric in which the data is received.

The user data and satisfaction information is analyzed to identify and/or determine lens features based on correlations in the user data and the satisfaction information, as shown in block 430. The analysis may be performed periodically after a certain amount or number of data is received, may be performed at regular time intervals, or may be performed when new data is received. As part of this analysis, groups of similar data may be identified and trends and relationships among data observed. A decision engine and/or rules may be applied to the data as a whole and/or in groups to create additional rules for lens parameter generation. The analysis may include creating a machine learning model and iterating the machine learning model over the various kinds of data. The machine learning model may evaluate and create lens parameter generation rules based on the various kinds of data and the analysis of the data. As the amount of data in the database grows, the machine learning model adapts such that the machine learning model amends existing and/or creates new lens parameter generation rules based on the various kinds of data and the analysis of the data. The machine learning model may later be used to evaluate and create lens generation parameters based on new wearer user data and a new wearer lens prescription.

New wearer information including a lens prescription from a new wearer and user data for the new wearer is received, as shown in block 440.

Lens parameters for the new wearer are generated, including evaluating lens manufacturing characteristics based on the analyzing in correlation with the new wearer information, as shown in block 450. The generating lens parameters and related evaluating may be achieved using the machine learning model, decision engine and/or rules created as part of the analysis described above and performed regarding block 430.

A lens according to the lens parameters generated in block 450 may then be manufactured and delivered to the wearer, as shown in block 460. The manufacturing of the lens according to the parameters may be performed by the same or different entity that performed the analysis (430) and generates lens parameters (450).

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for deriving ophthalmic lens configurations using machine learning comprising:
    receiving user data from a plurality of lens wearers, the user data including at least two selected from the group including a plurality of biometric data, a plurality of optometric data, a plurality of frame data and a plurality of lifestyle data;
    receiving lens configuration information;
    receiving satisfaction information for a plurality of lens wearers;
    applying machine learning to the user data, the lens configuration information, and the satisfaction information to identify correlations between the user data, the configuration information and the satisfaction information, including evaluating and creating lens parameter generation rules based on the user data, the lens configuration information, the satisfaction information and correlations between features included in the user data, the lens configuration information and the satisfaction information, and repeating the applying machine learning when additional user data is received, and/or when additional satisfaction information is received, and/or on a regular basis;
    receiving new wearer information including a lens prescription from a new wearer and user data for the new wearer;
    producing an ophthalmic lens configuration for the new wearer including evaluating lens manufacturing characteristics based on the machine learning in correlation with the new wearer information and considering the lens configuration information;
    manufacturing a lens according to the ophthalmic lens configuration.

2. The method of claim 1 further comprising: storing the user data and the satisfaction information in a database.

3. The method of claim 1 wherein the user data includes the plurality of biometric data and the plurality of biometric data includes at least two selected from the group including: pupillary distance, pupil height, head position and tilt, Harmon distance.

4. The method of claim 1 wherein the user data includes the plurality of optometric data and the plurality of optometric data includes at least two selected from the group including: lens addition information, prism requirement information, binocular disorders, vision related health information, historical kind of lens used by the wearer.

5. The method of claim 1 wherein the user data includes the plurality of frame data and the plurality of frame data includes at least two selected from the group including: pantoscopic and wrapping tilts, vertex distances, distance between lenses, frame contour.

6. The method of claim 1 wherein the user data includes the plurality of lifestyle data and the plurality of lifestyle data includes at least two selected from the group including: wearer age, wearer gender, wearer geographic location, wearer activity, postural behavior.

7. The method of claim 1 wherein the lens configuration information includes at least two selected from the group including: lens material, lens geometry, lens optical properties, lens optical performance, progressive lens design features, lens coatings, lens manufacturer, lens dispensing site.

8. The method of claim 1 wherein the machine learning includes recommending the ophthalmic lens configuration based on the new wearer having similar user data with at least one of the plurality of lens wearers having high satisfaction for the ophthalmic lens configuration.

9. The method of claim 1
    wherein the machine learning includes
        identifying low satisfaction groups and corresponding lens configuration features, and
    wherein the method further includes
        determining when user data includes lens information that corresponds to a low satisfaction group and
        recommending a different lens configuration to increase satisfaction for the new wearer.

* * * * *